Jan. 1, 1929.

W. G. HAEHL

CLUTCH PEDAL HOLDER

Filed Feb. 29, 1928

1,697,727

INVENTOR.
William G Haehl

By Geo. P. Kimmel ATTORNEY.

Patented Jan. 1, 1929.

1,697,727

UNITED STATES PATENT OFFICE.

WILLIAM G. HAEHL, OF MANILLA, INDIANA.

CLUTCH-PEDAL HOLDER.

Application filed February 29, 1928. Serial No. 258,059.

This invention relates to a clutch pedal holder or retainer, designed primarily for use in connection with tractors of the Ford type, but it is to be understood that a clutch pedal holder, in accordance with this invention may be employed for use with any type of machine for which it is found applicable, and the invention relates more particularly to an improvement upon the clutch pedal holder or retainer disclosed in Letters Patent 1,592,631, granted to me July 13, 1926, and the invention not only embodies the objects and advantages as set forth by the Letters Patent aforesaid, but has for its further object to provide, in a manner as hereinafter set forth, a new, novel and improved form of retainer member carried by the clutch pedal and with such member arranged with respect to the clutch pedal to prevent the shifting thereof when in contact with the holder member which forms an element of the clutch pedal holder or retainer.

A further object of the invention is to provide, in a manner as hereinafter set forth, a clutch pedal holder or retainer including a retainer member and means associated therewith to prevent the shifting of such member when secured to the clutch pedal and further with said member so constructed and arranged relative to the clutch pedal to prevent the member revolving relative to the clutch pedal when pressure is applied to the member.

A further object of the invention is to provide, in a manner as hereinafter set forth, a clutch pedal holder or retainer for releasably securing a clutch pedal in operative position during the operation of the tractor to overcome the inconvenience of maintaining the foot constantly on such pedal to hold the latter in the position referred to.

Further objects of the invention are to provide, in a manner as hereinafter set forth a clutch pedal holder or retainer for the purpose referred to, which is simple in its construction and arrangement, readily applied to a tractor body without changing the construction thereof in any manner, adjustable, strong, durable, compact, resilient, thoroughly efficient in its use, conveniently operated, and inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1:
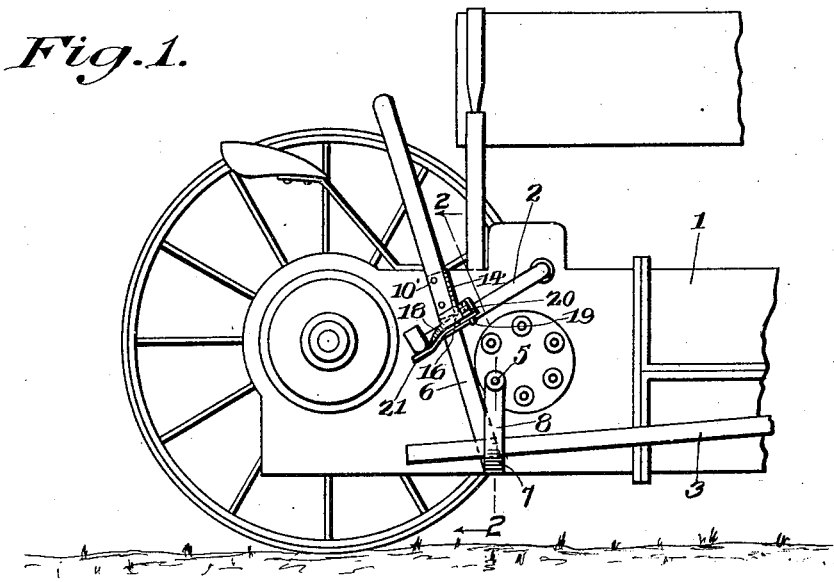
Figure 1 is a fragmentary view, in side elevation, of a tractor showing the adaptation therewith of a clutch pedal holder or retainer in accordance with this invention.
Figure 2:
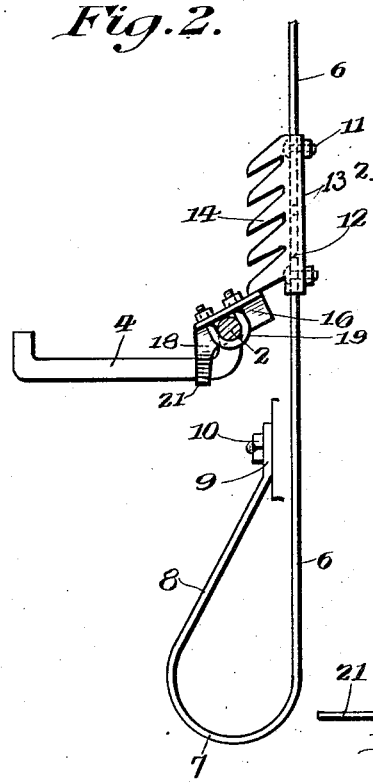
Figure 2 is a rear elevation of a clutch pedal holder or retainer in accordance with this invention showing the adaptation thereof with respect to the clutch pedal.
Figure 3:
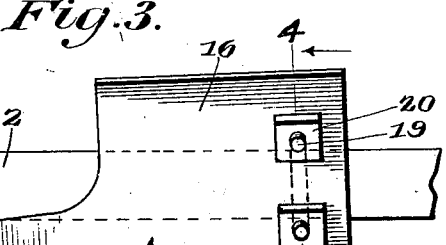
Figure 3 is an elevation of the retainer member and illustrating the adaptation thereof with respect to the clutch pedal.
Figure 4:
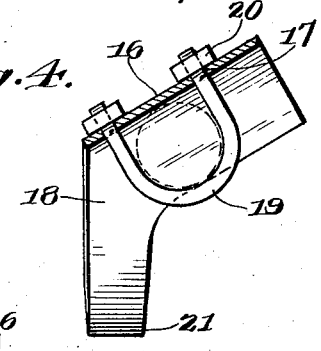
Figure 4 is a section on line 4—4 Figure 3.
Figure 5:
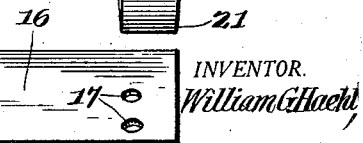
Figure 5 is a perspective view of the retainer member.

Referring to the drawings in details 1 denotes the body portion of a tractor, 2 the clutch pedal thereof and 3 the exhaust pipe or manifold of a tractor. The pedal 2 is provided with right angularly disposed foot treads 4.

A clutch pedal holder or retainer, in accordance with this invention includes a hand lever formed from a substantially elongated narrow bar of spring metal and which is so constructed as to have its lower portion extend around the manifold 3 and be fixedly secured to the body portion of the tractor 1, as at 5. The hand lever carries a holder member which is normally positioned in the path of a retainer member carried by the pedal 2, so that when the latter is shifted to operative position, the said members will coact to maintain the pedal in operative position during the operation of the tractor, thereby overcoming the inconvenience of maintaining the foot constantly on the pedal to hold it in the position referred to.

The hand lever includes a resilient arm 6, terminating at its lower end in an upwardly extending offset arcuate coupling portion 7, which merges into an inwardly inclined arm 8, terminating at its upper end in a vertically disposed apertured lug 9, secured at the point 5 by the holdfast device 10 to the tractor body. The arm 6 projects at a rearward inclination with respect to the arm 8 and is of such height as to be in convenient reach of the operator of the tractor.

The lower terminal portion of the arm 6 is positioned at the inner side of the exhaust manifold 3, and the coupling portion 7 extends around the bottom and outer side of the exhaust manifold 3, and when the lug 9 is secured to the body portion of the tractor 1, the coupling portion 7 is maintained in the position referred to. The arm 6 is not fixedly secured to the body portion of the tractor 1, and owing to the arrangement of the arm 6 and coupling portion 7, said arm 6 is unusually resilient which allows for the same to be shifted laterally with respect to the clutch pedal 2 whereby the holder and retaining members will be moved clear of each other and the clutch pedal released.

When the clutch pedal 2 has been shifted to the desired position, the arm 6 can spring forward whereby the holder and retaining members will coact to maintain the clutch pedal 2 in the desired position.

The arm 6, intermediate its ends, is provided with a lengthwise extending set of openings 10′ and associated therewith is a pair of holdfast devices 11 for securing a holder member 12 to the said arm and said member 12 consists of a rectangular plate 13 provided with openings for the passage of the holdfast devices 11. One side of the plate 13 is formed with a group of forwardly extending superposed spaced teeth 14, which incline downwardly and are disposed at right angles with respect to the plate 13, and any one of which can be engaged by a clutch pedal retaining member, to be presently referred to, to arrest the upward movement of the clutch pedal. The group of teeth 14 are disposed at the forward side edge of the arm 6 see Figure 1 and are interposed between the arm 6 and the clutch pedal 2. The holder member 12 can be connected to the arm 6, in the same manner as that disclosed in the Letters Patent aforesaid.

The retaining member which is carried by the clutch pedal 2, is referred to generally by the reference character 15 and comprises a rectangular body portion 16 of a width materially greater than the diameter of the pedal 2. The body portion at its forward end is formed with a pair of openings 17 and one of said openings is positioned in proximity to the outer side edge of the body portion 16 and the other opening 17 is positioned in proximity to the first mentioned opening. The space between the opening 17 is slightly greater than the diameter of the pedal 2. The body portion 16 when mounted on the pedal 2 is disposed at an inclination and projects a substantial distance inwardly from said pedal 2. Projecting from the rear end of the body portion 16 is a curved arm 18. The body portion 16 is secured upon the pedal 2 by a yoke 19 having its arms extending through the openings 17 and carrying securing nuts 20 abutting against the upper face of the body portion 16. The yoke 19 extends around the pedal 2 and in connection with the nuts 20 fixedly secures the body portion 16 to the pedal. The arm 18 has its free end offset as at 21. The arm 18 is adapted to be extended under the foot tread 4 and acts in connection with the yoke 19 and nuts 20 to prevent any shifting of the retaining member 15, relative to the pedal 2, when pressure is applied to the body portion 16 of the member 15. The body portion 16 is positioned relatively to the pedal 2 to engage any of the teeth 14 when the arm 6 is moved forwardly or sprung forwardly when released.

When the retaining member is in engagement with the holding member, the tendency of the pedal 2 is to move upwardly thereby setting up a binding action between said members, under such conditions the pedal 2 will be maintained in its set position until it is released in the manner as hereinbefore stated, and further the manner of securing the member 15 to the pedal 2, is such as to prevent any shifting of the member 15 due to the tendency of the pedal 2 to move upwardly.

It is thought the many advantages of a clutch pedal holder or retainer in accordance with this invention, can be readily understood, and although the preferred embodiment of the invention is as illustrated and described, yet it is to be understood that changes in the details of construction can be had which fall within the scope of the invention as claimed.

What I claim is:—

1. In a clutch pedal holder of that type including a holder member carried by a resilient hand lever, a retainer member coacting with the holder member to retain a foot operated clutch pedal in set position, said retainer member comprising a body portion for seating on the clutch pedal, means for clamping said body portion at an upward inclination to and upon the clutch pedal, and an arm projecting rearwardly from said body portion for engagement against the bottom of the foot tread of and below the clutch pedal.

2. In a clutch pedal holder of that type including a holder member carried by a resilient hand lever, a retainer member coacting with the holder member to retain a foot operated clutch pedal in set position, said retainer member comprising a body portion for seating on the clutch pedal, means for clamping said body portion at an upward inclination to and upon the clutch pedal, and an arm projecting rearwardly from said body portion for engagement against the bottom of the foot tread of and below the clutch pedal, said body portion of a width to project outwardly and inwardly with respect to the clutch pedal and said arm arranged at the outer side of said body portion.

3. In a clutch pedal holder of that type including a holder member carried by a resilient hand lever, a retainer member coacting with the holder member to retain a foot operated clutch pedal in set position, said retainer member comprising a body portion for seating on the clutch pedal, means for clamping said body portion at an upward inclination to and upon the clutch pedal, and an arm projecting rearwardly from said body portion for engagement against the bottom of the foot tread of and below the clutch pedal, said arm formed with a curved part and an offset part extended from said curved part.

4. In a clutch pedal holder, a retainer member comprising a rectangular body portion having extending from one side of one end thereof a holding arm having an offset free terminal portion for engagement with the foot tread of a clutch pedal, said body portion in proximity to its other end provided with openings for the passage of holdfast means to secure said member to a clutch pedal forwardly of the foot tread thereof.

In testimony whereof, I affix my signature hereto.

WILLIAM G. HAEHL.